May 1, 1951  K. D. McMAHAN  2,551,276
DUAL VORTEX LIQUID SPRAY NOZZLE
Filed Jan. 22, 1949
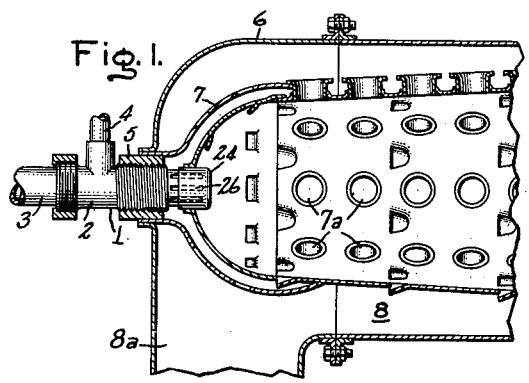
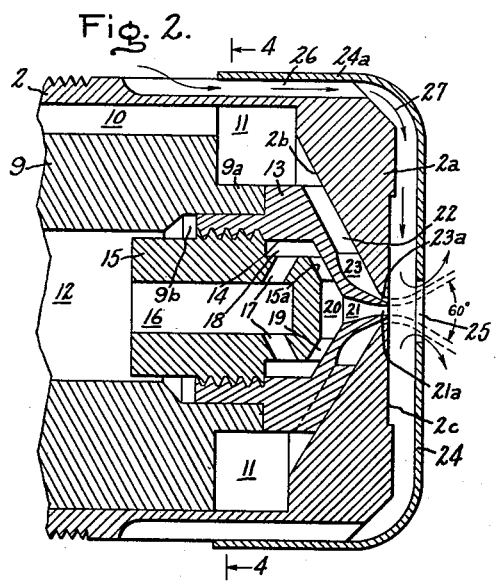
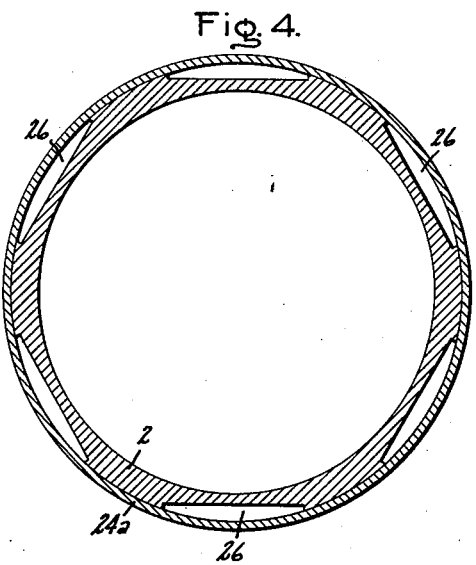
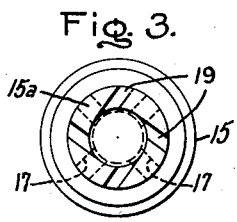
Inventor:
Kenton D. McMahan,
by  *Prowell P. Mack*
His Attorney.

Patented May 1, 1951

2,551,276

UNITED STATES PATENT OFFICE 2,551,276

DUAL VORTEX LIQUID SPRAY NOZZLE

Kenton D. McMahan, Schenectady, N. Y., assignor to General Electric Company, a corporation of New York Application January 22, 1949, Serial No. 72,216

1 Claim. (Cl. 299—114)

This invention relates to liquid spray nozzles, particularly those of the vortex type having "spin chambers" from which a conical spray emerges through a discharge orifice. While not limited thereto, the invention is particularly intended for spraying liquid fuels such as kerosene, as used for instance in the combustors of gas turbine powerplants.

When used in gas turbine combustors, it is usually desirable, and sometimes absolutely essential, that the fuel spray nozzle produce a spray pattern in the form of a hollow cone having a very nearly fixed vertex angle, referred to hereinafter as the "cone angle." Because of the very precise design required in a combustor for a gas turbine powerplant, especially those used in aircraft powerplants where the device must operate effectively over an extreme range of atmospheric pressures, it is necessary that the cone angle remain fixed over the extremely wide range of fuel supply pressures and flow rates, in order that the combustor will produce clean combustion with a stable flame, and be not subject to "blow-out" or other erratic operating characteristics. For instance, in the small 300 H. P. gas turbine powerplant for which the present invention was developed, a nozzle is required which will deliver fuel with a constant spray angle over a range of pressure from 50 to 500 pounds per square inch, corresponding to flow rates of from ½ to 30 gallons per hour, over a range of altitudes from sea level to 40,000 feet.

The object of the present invention is to provide a satisfactory nozzle of the type described which will produce very nearly a constant spray angle under the extremely difficult operating conditions encountered in modern aircraft gas turbine powerplants.

Other objects and advantages will be apparent from the following description taken in connection with the accompanying drawing in which Fig. 1 is a view in elevation of a nozzle arranged in accordance with the invention, showing its relation to the combustor and fluid supply lines, Fig. 2 is an enlarged detail view of the nozzle tip assembly; Fig. 3 is an end view in elevation of a component of the nozzle tip assembly; and Fig. 4 is another partial sectional view illustrating a detail of the nozzle cooling shroud.

Referring now more particularly to Fig. 1, the nozzle assembly indicated generally at 1 consists of a housing or body member 2 which is substantially cylindrical and has at one end a primary inlet port to which liquid under pressure is supplied through conduit 3, and a secondary port to which liquid under pressure is supplied through conduit 4. The nozzle assembly is supported by being threadedly received, or otherwise secured, in a bushing 5 welded into an opening in the outer housing or casing 6 of the combustor. Spaced from the outer casing 6 is an inner liner or "end dome" having a wall 7 with a central aperture through which the end of the nozzle tip assembly projects slightly, as shown. It will readily be appreciated by those skilled in the art that air under pressure is supplied from a suitable compressor (not shown) through inlet 8a to the plenum chamber 8 defined between the outer casing 6 and the inner liner 7, from whence this air flows into the reaction space defined within the inner liner through suitable openings 7a. Further details of the combustor assembly are shown in my copending application Serial No. 705,866, filed October 26, 1946, now Patent Number 2,510,645, and assigned to the assignee of the present application. The details of the combustor and the fluid supply passages in the nozzle are not material to an understanding of the present invention, which relates specifically to the detailed arrangement of the spin chambers, fluid discharge orifices, and nozzle tip cooling shroud, as described more particularly hereinafter.

Referring now to Fig. 2, the forward end of the nozzle housing 2 is provided with an end portion 2a defining a conical inner surface 2b against which the nozzle tip assembly is held. Within the bore of the housing 2 is an inner member 9 having one or more longitudinal grooves 10 which cooperate with housing 2 to form longitudinal passages supplying fluid from the inlet conduit 4 to the annular space 11 defined between the end of member 9 and housing 2. The inner nozzle member 9 is provided with a central bore 12, which communicates with inlet conduit 3. The end portion 9a of the inner nozzle member 9 defines a bore 9b in which is received the secondary nozzle tip member 13. Member 13 similarly has a central bore 14 threadedly receiving the primary nozzle tip member 15.

The primary tip member 15 has a central bore 16 forming an inlet chamber communicating with the bore 12 and with a plurality of drilled holes 17 communicating with an annular chamber 18 defined between the reduced end portion of member 15 and the bore 14 of the secondary nozzle tip member 13. The conical end portion 15a of the primary tip member is provided with a plurality of grooves or "slots" 19 communicating at their outer ends with the annular chamber 18 and discharging tangentially into the primary spin chamber 20 defined between the end of member 15 and the adjacent portions of the secondary tip member 13. The arrangement of the slots 19 may be seen more clearly in Fig. 3, which is an end view, in elevation, of the primary tip member 15.

As noted above, the secondary tip member 13 is received in the recess 9b, being clamped between the end portion 9a and the adjacent conical surface 2b of the housing end portion 2a. Besides cooperating with the primary tip member 15 to form the annular supply chamber 18 and the primary slots 19, tip member 13 has a central conical bore 21 forming an axial extension of the primary spin chamber 20, terminating at a cylindrical portion 21a which forms the primary discharge orifice. The conical end surface of tip member 13 which engages the surface 2b is provided with a plurality of slots 22 having outer end portions communicating with the annular supply chamber 11 and discharging tangentially into an annular secondary spin chamber 23, which as may be seen in Fig. 2 is of somewhat conical configuration and terminates at an annular secondary discharge orifice 23a.

It will be obvious to those skilled in the art that innumerable mechanical arrangements are possible for defining the primary spin chamber 20 and orifice 21a and the secondary spin chamber 23 and its related discharge orifice 23a, and I of course do not contemplate that my invention is limited to the precise mechanical details shown in the drawing. The important factors in my invention are the following:

1. The primary discharge nozzle 21 is located within what is ordinarily the "air core" of the secondary spin chamber 23.

2. The sharp discharge edge of the primary orifice 21a is either exactly or very nearly so, in the plane of the discharge edge of the secondary orifice 23a.

With my nozzle, the cone angles of both the sprays formed by the primary and secondary nozzles are independently adjustable by varying the angle and size of slots 19 and 22 respectively, which is not possible with conventional duplex type nozzles. Likewise, the flow rates of the primary and secondary nozzles are independently adjustable over extremely wide ranges.

In designing a nozzle in accordance with the invention, the spin chambers and discharge orifices may be calculated, in accordance with well-known principles governing the operation of such nozzles, so that the primary discharge orifice 21a, operating by itself entirely independent of the secondary orifice 23a, produces a spray pattern in the form of a hollow cone having a vertex angle of the desired magnitude, for instance 60°. Similarly the secondary spin chamber 23 and its associated annular orifice 23a is designed to produce the same cone angle when operating by itself.

In operation, the respective primary and secondary spin chambers and discharge orifices cooperate to produce a single combined conical spray which has been found to remain constant over an extremely wide operating range. For instance, in starting the combustor at low rates of fuel flow, liquid fuel is supplied through conduit 3 at a pressure of about 50 pounds per square inch, that is, the minimum value required to produce the necessary spray angle from the primary discharge orifice 21a. For increasing flow rates, the fuel supply pressure to the primary orifice is increased from the initial value of 50 pounds per square inch up to perhaps 400 pounds per square inch, or even higher, over which range the primary orifice acting alone will produce the desired constant spray angle. Then to obtain still larger flow rates, liquid is supplied through the inlet conduit 4 to the secondary spin chamber and annular orifice 23a. When the supply pressure of this secondary fluid is below a certain critical value, for instance 35 pounds per square inch, the velocities in the secondary spin chamber 23 are not sufficiently high to produce good atomization, therefore the particle size in the spray from the secondary orifice will be larger than the optimum for good combustion. The merging of this poorly atomized spray with the finely divided spray from the primary orifice may cause the cone angle of the combined spray to decrease, perhaps 5° or so. However, as the supply pressure to the secondary spin chamber increases, the velocities therein increase; and, at a pressure of about 40 pounds per square inch, good atomization is obtained from the secondary orifice and the combined spray angle returns exactly to the desired design value. It has been found that with the primary orifice operating at its maximum value and the supply pressure to the secondary orifice varying over a wide range, for instance from 40 to 400 pounds per square inch, the cone angle of the combined spray produced by the two orifices will remain within perhaps plus or minus 2 per cent of the desired design angle. This is most desirable in a gas turbine combustor of the type described in my aforementioned copending application.

Tests of an improved nozzle in accordance with my invention reveal that when operating in a gas turbine combustor, there is a tendency for unburned or partly burned fuel particles to deposit and "carbonize" on the outer end surface 2c of the nozzle. If this accumulation of carbon progresses far enough, it tends to "overhang" the edge of the secondary annular orifice 23a, thereby decreasing the area of, or even plugging up completely, the orifice 23a and seriously interfering with the operation of the nozzle. This deposition and accumulation of carbon on the end wall 2c may be prevented by the cooling and insulating air shroud 24. This consists of a stamped or spun sheet metal cup having a circumferential axially extending portion 24a adapted to engage the cylindrical outer surface of housing 2. A central orifice 25 is formed in the shroud 24 coaxial with the fluid discharge orifices 21a, 23a. The diameter of opening 25 is somewhat larger than the diameter of the spray cone at that location in order that liquid particles from the spray pattern will not be trapped by the shroud, but so that, instead, the cooling air flow through the shroud (referred to hereinafter) will have an annular exit orifice defined between the edge of the orifice 25 and the outer surface of the spray cone pattern.

As may be seen in Fig. 2, the shroud sidewall 24a terminates at a location between the inner liner 7 and the outer combuster housing 6. Formed in the outer surface of nozzle housing 2 are a plurality of longitudinally extending grooves 26, which are closed by the shroud wall portion 24a as shown in Fig. 4 so as to form cooling channels communicating with the air supply plenum chamber 8 at one end and with the annular space defined between the shroud 24 and the adjacent end surface 2c of the nozzle body. It will therefore be apparent that the pressure differential between the plenum chamber 8 and the combustion space, which differential causes the flow of combustion air into the reaction space, will also cause a flow of cooling air as indicated by the arrows 27. This air flow 27 resists any tendency of fuel particles to enter the space between shroud 24 and surface 2c.

It has been found in much actual operation that this arrangement does effectively and completely prevent the deposition of carbon particles which might tend to plug the fluid discharge orifices. At the same time, this air flow also serves to cool the nozzle tip parts, so as to preserve them from deterioration due to exposure to the extremely high temperature gases in the combustion space. The shroud of course acts as a radiation shield between the nozzle tip parts and the flame in the combustion space. Tests of a gas turbine combustor in accordance with my above-mentioned copending application and having an improved fuel nozzle in accordance with the present invention, show that the combination is so efficient that there appears to be no upper limit of "blow-out"; that is, the fuel-air ratio may be increased apparently without limit, without causing blow-out. This is in sharp contrast to experience with other types of fuel nozzles and combustors in which there is a definite limit of fuel-air ratio beyond which blow-out occurs. The constant spray angle produced by nozzles incorporating the present invention is believed to be of the utmost importance in obtaining such greatly improved results.

While a preferred embodiment of the invention has been described specifically, it will be apparent that many similar structures may be devised which will operate similarly, and I desire to cover by the appended claim all such changes and modifications as fall within the true spirit and scope of the invention.

What I claim as new and desire to secure by Letters Patent of the United States is:

In a dual liquid spray nozzle of the vortex type, the combination of walls defining an outer whirl chamber and including a forward wall portion defining a circular discharge orifice, the outer chamber and orifice being constructed to produce a hollow conical spray pattern of a preselected cone angle, and walls defining a second smaller whirl chamber disposed coaxial within said outer chamber and having a conical forward wall portion of reduced diameter adapted to be disposed within the air core formed by whirling liquid in the outer chamber in normal operation, the inner chamber and orifice being constructed to produce a hollow conical spray pattern of the same preselected cone angle, said forward wall portions defining together a central sharp-edged circular orifice communicating with the second whirl chamber and closely surrounded by a sharp-edged annular orifice communicating with the outer whirl chamber, said inner and outer orifices lying in the same plane whereby the hollow spray cone patterns formed by the respective whirl chambers and related orifices combine to form a single spray pattern of constant vertex angle over a wide range of flow rates, and walls defining passages for separately supplying liquid to said respective whirl chambers.

KENTON D. McMAHAN.

REFERENCES CITED

The following references are of record in the file of this patent:

UNITED STATES PATENTS

| Number | Name | Date |
|---|---|---|
| 1,093,996 | Kestner | Apr. 21, 1914 |
| 1,526,429 | Morse | Feb. 17, 1925 |
| 1,536,046 | Anthony | May 5, 1925 |
| 1,641,581 | Egan | Sept. 6, 1927 |
| 2,374,290 | Johansson | Apr. 24, 1945 |
| 2,411,181 | Altorfer | Nov. 19, 1946 |